United States Patent
Shanmugam et al.

(10) Patent No.: US 10,445,220 B2
(45) Date of Patent: Oct. 15, 2019

(54) SYSTEM AND METHODS FOR APPLICATION ACTIVITY CAPTURE, ERROR IDENTIFICATION, AND ERROR CORRECTION

(71) Applicant: Verizon Patent and Licensing Inc., Arlington, VA (US)

(72) Inventors: Sankar Shanmugam, Dayton, NJ (US); Sridhar Sundaraju, Edison, NJ (US); Suja John, Somerset, NJ (US); Sivagnanalingam Sivaganesh, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 15/415,418

(22) Filed: Jan. 25, 2017

(65) Prior Publication Data

US 2018/0210808 A1    Jul. 26, 2018

(51) Int. Cl.
  *G06F 11/00*   (2006.01)
  *G06F 11/36*   (2006.01)
  *G06N 20/00*   (2019.01)

(52) U.S. Cl.
  CPC .......... *G06F 11/366* (2013.01); *G06N 20/00* (2019.01)

(58) Field of Classification Search
  CPC .. G06F 2201/86; G06F 11/32; G06F 11/3476; G06F 11/3006; G06F 11/3466; G06Q 10/0633; H04L 41/22; H04L 67/22; H04L 41/069
  See application file for complete search history.

(56) References Cited

U.S. PATENT DOCUMENTS

| | | | | |
|---|---|---|---|---|
| 6,907,545 B2* | 6/2005 | Ramadei | ............ | G05B 23/0248 706/45 |
| 7,788,365 B1* | 8/2010 | Foster | ............ | H04L 43/00 709/201 |
| 8,055,689 B1* | 11/2011 | Wookey | ............ | G06F 16/27 707/814 |
| 8,112,301 B2* | 2/2012 | Harvey | ............ | G06Q 10/0639 705/14.41 |
| 9,141,759 B2* | 9/2015 | Burich | ............ | G06F 19/3418 |
| 9,300,523 B2* | 3/2016 | Alon | ............ | H04L 41/044 |
| 9,454,444 B1* | 9/2016 | Agarwal | ............ | G06F 11/2023 |
| 9,826,100 B2* | 11/2017 | Hughes | ............ | H04M 15/00 |
| 10,110,524 B1* | 10/2018 | Chau | ............ | G06F 16/248 |
| 10,310,708 B2* | 6/2019 | Fletcher | ............ | G06F 3/0482 |

(Continued)

*Primary Examiner* — Loan L. T. Truong

(57) ABSTRACT

A device may obtain data regarding application activity from a group of user devices. The application activity may relate to an application associated with network operator services provided by a network operator. The device may process the data regarding the application activity to generate a visualization of the application. The visualization of the application activity may include multiple tiers. The multiple tiers may correspond to at least a group of users, a user, and a session. The visualization may identify one or more errors associated with the application activity. The device may provide the visualization of the application activity for display. The visualization may be provided for display via a client device associated with the network operator. The device may automatically implement, without human intervention, a correction to the one or more errors.

20 Claims, 7 Drawing Sheets

(56) References Cited

U.S. PATENT DOCUMENTS

| | | | |
|---|---|---|---|
| 2002/0154175 A1* | 10/2002 | Abello | G06T 11/206 715/853 |
| 2004/0054984 A1* | 3/2004 | Chong | H04L 67/16 717/103 |
| 2005/0183143 A1* | 8/2005 | Anderholm | G06F 11/32 726/22 |
| 2006/0026286 A1* | 2/2006 | Lei | G06F 12/0875 709/227 |
| 2007/0255819 A1* | 11/2007 | Hua | H04L 45/00 709/224 |
| 2008/0037532 A1* | 2/2008 | Sykes | H04L 41/147 370/389 |
| 2009/0043646 A1* | 2/2009 | Pingali | G06F 11/3409 705/7.27 |
| 2010/0318491 A1* | 12/2010 | Anderson | G06Q 30/02 706/52 |
| 2011/0041083 A1* | 2/2011 | Gabai | G06Q 10/00 715/753 |
| 2011/0055817 A1* | 3/2011 | Noble | G06F 11/32 717/127 |
| 2011/0153506 A1* | 6/2011 | Patterson | G06Q 10/06 705/301 |
| 2011/0179160 A1* | 7/2011 | Liu | G06F 11/323 709/224 |
| 2011/0236870 A1* | 9/2011 | Chinosornvatana | G09B 7/08 434/322 |
| 2012/0005542 A1* | 1/2012 | Petersen | G06F 11/0709 714/48 |
| 2012/0124503 A1* | 5/2012 | Coimbatore | G06F 11/328 715/772 |
| 2012/0253484 A1* | 10/2012 | Burich | G06F 19/3418 700/91 |
| 2013/0151542 A1* | 6/2013 | Ben-Natan | H04L 69/22 707/755 |
| 2013/0297976 A1* | 11/2013 | McMillen | G06F 11/079 714/43 |
| 2013/0300747 A1* | 11/2013 | Wong | G06T 11/206 345/440.2 |
| 2013/0332594 A1* | 12/2013 | Dvir | G06F 11/00 709/224 |
| 2014/0281741 A1* | 9/2014 | Bohacek | G06F 11/3409 714/47.3 |
| 2014/0359036 A1* | 12/2014 | Blakers | H04L 51/26 709/206 |
| 2015/0172321 A1* | 6/2015 | Kirti | H04L 63/20 726/1 |
| 2015/0350338 A1* | 12/2015 | Barnett | H04L 67/22 709/203 |
| 2018/0046637 A1* | 2/2018 | Koopman | G06F 17/3089 |
| 2018/0121461 A1* | 5/2018 | Natarajan | G06F 17/30156 |
| 2018/0196707 A1* | 7/2018 | Gaha Tchamabe | G06F 11/079 |

\* cited by examiner

| # | Activity Name | Event Type | Group name | Flow Name | Time |
|---|---|---|---|---|---|
| 0 | /mf/myfeed | page | Feed | Ubiquitous | 00:46:46 |
| 1 | Global nav:nav | click | Feed | Ubiquitous | 00:46:56 |
| 2 | /mf/menu | page | Menu | Ubiquitous | 00:46:56 |
| 3 | :buy an lg | click | Menu | Ubiquitous | 00:47:02 |
| 4 | /mf/shop/device detailes/lg v20/features | page | PDP | Buy+Upgrade | 00:47:04 |
| 5 | Feaures:paginate | click | PDP | Buy+Upgrade | 00:47:15 |
| 6 | customize | click | PDP | Buy+Upgrade | 00:47:29 |
| 7 | /mf/upgrade device error screen | page | Unhappy paths and errrors | Buy+Upgrade | 00:47:30 |
| 8 | Global nav:back | click | Unhappy paths and errors | Buy+Upgrade | 00:47:44 |
| 9 | /mf/shop/device detailes/lg v20/features | page | PDP | Buy+Upgrade | 00:47:44 |
| 10 | Sub nav:lg v20:reviews | click | PDP | Buy+Upgrade | 00:47:51 |
| 11 | /mf/shop/device detailes/lg v20/reviews | page | PDP | Buy+Upgrade | 00:47:51 |
| 12 | Sub nav:lg v20:specs | click | PDP | Buy+Upgrade | 00:48:05 |

FIG. 1C

Error Remediation

Recommendation:
- ☒ Roll Back Software Update
- ☒ Reallocate Application Cloud Processing Resources
- ☒ Fix Broken Link

[Implement]

FIG. 1D

SYSTEM AND METHODS FOR APPLICATION ACTIVITY CAPTURE, ERROR IDENTIFICATION, AND ERROR CORRECTION

BACKGROUND

A user device may store data regarding use of applications (e.g., software applications executing on the user device). For example, the user device may store data identifying buttons pressed by a user of the user device, errors that occurred, and/or the like. Such applications may include applications to manage a user subscription to a network operator's service (e.g., subscribe to a mobile service, upgrade the mobile service, buy a mobile device, replace a mobile device, view data utilization associated with the subscription, and/or the like).

BRIEF DESCRIPTION OF THE DRAWINGS

FIGS. 1A-1D are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

User devices (e.g., mobile devices, such as smartphones) include multiple mobile applications. Users may use the mobile applications to perform various functions, such as web browsing, email, messaging, social media, managing subscriptions to network operator services, and/or the like. The user devices may store information about usage of a mobile application (e.g., buttons pressed, menu selections, information provided, data transmitted to an application server, etc.), and may periodically provide a log file to a server. The server may consolidate log files (e.g., from multiple time periods, multiple user devices, etc.), and may provide the consolidated data for analysis.

For such user devices, delays in periodic transmission of log data may result in a reduced ability to remediate or correct issues with an application. For example, delays hinder identification of network delays or processing bottlenecks. Furthermore, such delays hinder identification and/or assessment of the impact of poor user interface designs. This may result in, poor device performance, poor network performance, and/or the like. For example, such delays may result in excessive network traffic being generated as a result of errors in a user interface or excessive utilization of processing resources as a result of errors in a user interface. This may result in excessive utilization of energy resources, which may result in reduced battery life for a user device.

Implementations described herein provide a cloud platform to collect application activity data relating to an application associated with network operator services in real time or near real-time for real time or near real-time analysis and remediation or correction and repair of detected issues. For example, the cloud network may collect the activity data, perform analysis, and/or perform remediation or correction within a threshold period of time of collecting activity data, of an error occurring, and/or the like, such as within a few milliseconds, a few seconds, and/or the like. In this way, implementations described herein increase speed of data collection, increase speed of data presentation, and improve error activity management relative to other techniques for monitoring application activity. Based on increasing a speed of data collection, presentation, and associated error activity management, implementations, described herein, may result in reduced network traffic, reduced utilization of processing resources, and improved utilization of energy resources.

Figure 1A:
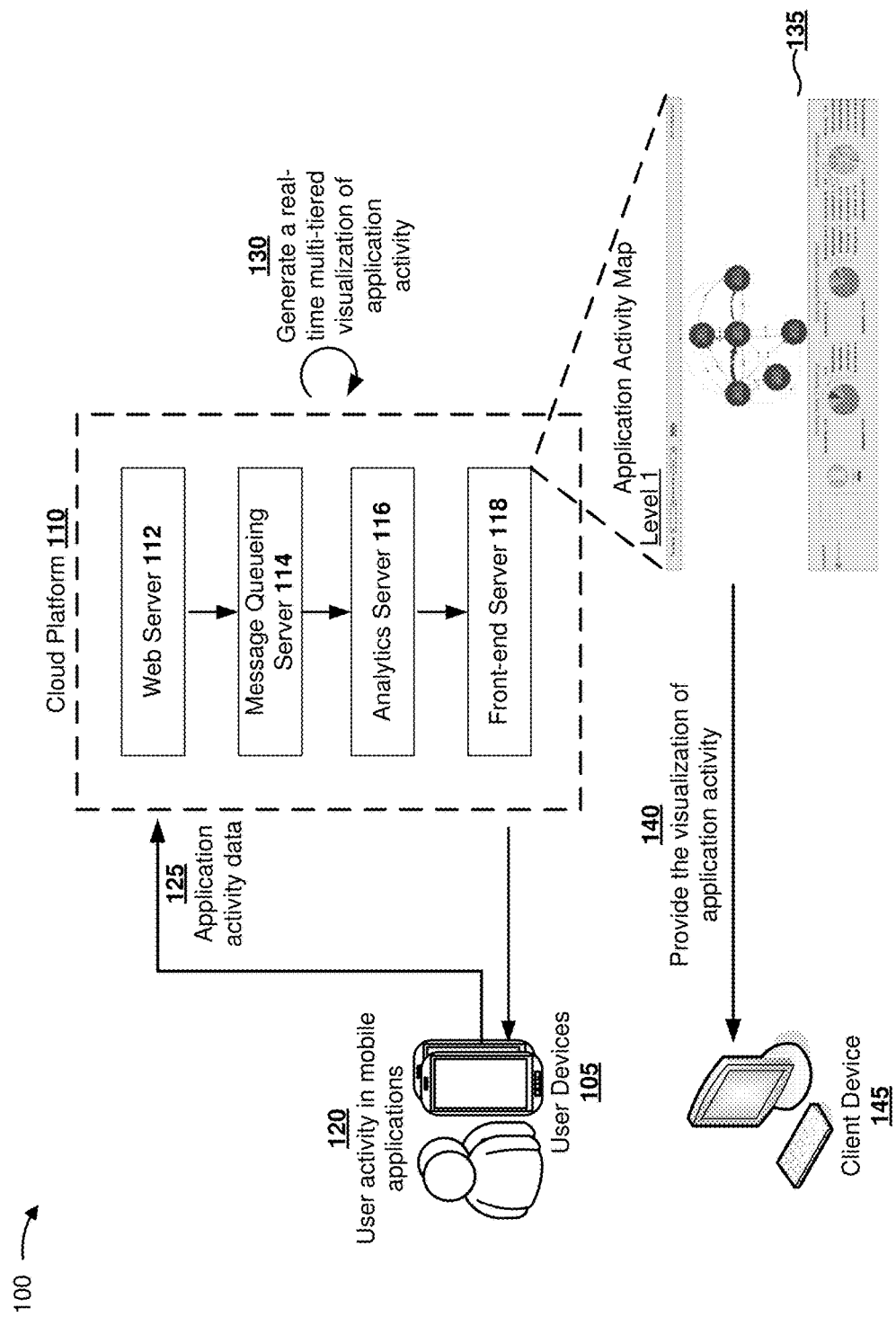

FIGS. 1A-1D are diagrams of an overview of an example implementation 100 described herein. FIG. 1A shows a flow of data from user device 105 to cloud platform 110 to client device 145 (e.g., used by a network operator to view user activity on user devices 105). As shown by reference number 120, a set of users of a set of user devices 105 may engage in user activity in a mobile application on user devices 105. For example, thousands, millions, or billions of users may utilize a corresponding quantity of user devices 105 to engage in user activity in mobile applications. As shown by reference number 125, user device 105 may provide, to cloud platform 110, application activity data associated with the user activity in the mobile application. The application activity data may include a set of log entries regarding button presses, processing, transmissions, timestamps, and/or the like. For example, each of the thousands, millions, or billions of user devices 105 may generate millions, billions, or trillions of data entries of the set of log entries regarding application activity. In some implementations, a log entry may map a user experience for a particular session using an application. For example, the log entry may include data identifying button presses, user interfaces provided, processing, etc. from opening the application to closing the application. As a particular example, a developer may deploy a new user interface for an ecommerce platform associated with providing network operator services, and cloud platform 110 may receive data regarding utilization of the new user interface in near-real time to permit cloud platform 110 to identify and remediate any errors in the new user interface. In this way, user experience is improved, user device performance is improved, and network performance is improved relative to a non-functioning user interface that is not fixed in real-time.

As further shown in FIG. 1A, cloud platform 110 may include web server 112 (e.g., one or more Nginx servers), message queuing server 114 (e.g., one or more IBM MQ servers), analytics server 116 (e.g., IBM streams, a data analytics dashboard, a Hadoop system, etc.), and front-end server 118 (e.g., a data presentation dashboard generation server). Each of servers 112 to 118 may be dynamically allocatable computing resources of cloud platform 110, that may be allocated based on a type of or an amount of processing that is to be performed. For example, at a first time interval, cloud platform 110 may allocate a set of computing resources to message queuing server 114 to queue data for processing, and at a second time interval cloud platform 110 may reallocate a portion of the set of computing resources for use in generating an application activity map, as described herein. In some implementations, cloud platform 110 may include computing resources to implement one or more other modules, such as an error identification computing resource (e.g., a server, a processor, etc.) to identify errors in an application based on analytics regarding the application activity, a recommendation server to generate a recommendation to remediate an error, a data acquisition computing resource (e.g., a server, a processor, a input/output, etc.) to acquire data from a point of sale device, and/or the like.

Web server 112 may submit the data (e.g., log entries) to message queuing server 114 in near real-time (i.e., which covers real-time or substantially real-time). Analytics server 116 may subscribe to the log entries and receive the log entries from message queuing server 114 in near real-time, and may perform analytics techniques, such as machine learning, natural language processing, pattern recognition, heuristics, and/or the like to process data (e.g., thousands, millions, billions, or trillions of data points of the log entries). Front-end server 118 may generate a user interface to present data associated with the log entries, such as by generating maps, pie charts, pop-up diagrams, and/or the like.

As shown by reference number 130, cloud platform 110 may generate a near real-time multi-tiered visualization of application activity. As shown by reference number 140, cloud platform 110 may provide the visualization of application activity in near real-time to client device 145, which may display the visualization in near real-time relative to data collection (e.g., by cloud platform 110) and/or data generation (e.g., by user devices 105). For example, cloud platform 110 may provide a first tier of the visualization pertaining to a group of users' application activity, a second tier of the visualization pertaining to a particular user's application activity, a third tier of the visualization pertaining to a particular session of application activity by a particular user, and/or the like.

As an example, client device 145 may display a flow diagram showing flows based on aggregated data representing application activity for multiple users and/or multiple user devices 105. In this case, the visualization may show multiple nodes (e.g., represented by grey circles on the application activity map shown by reference number 135). Each node may identify a particular flow, and may show information including a number of users accessing the flow, an average time spent by the users, and a count of the users that ended their navigation inside the particular flow.

Figure 1B:
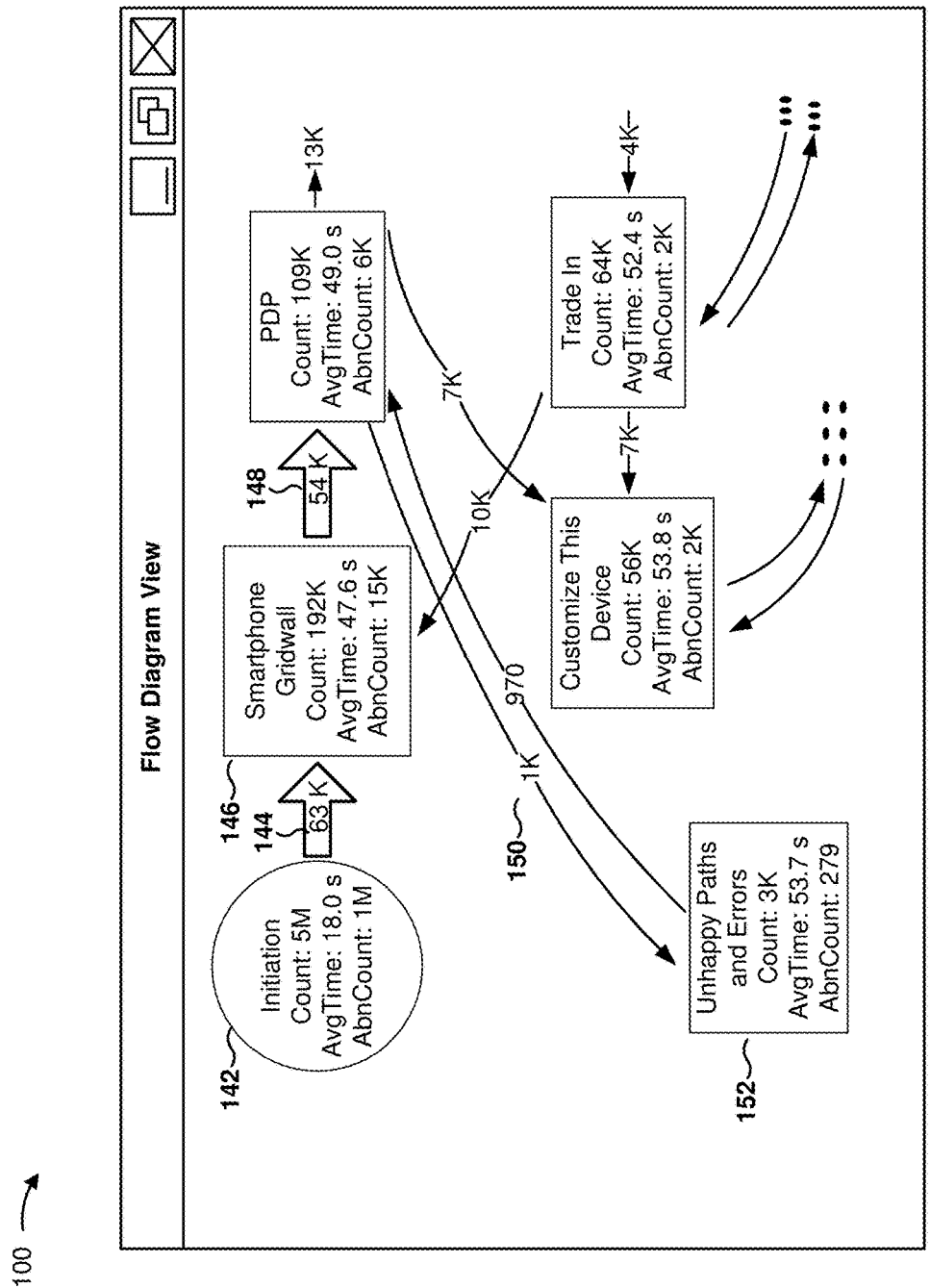

As another example, client device 145 may display a flow diagram showing flows based on user data representing application activity for a single user and/or a single user device 105. In this case, the visualization may show multiple nodes (e.g., represented by rectangles as shown by FIG. 1B) identifying activity groups associated with one or more individual flows (e.g., represented by circles as shown in FIG. 1B). Each node associated with a particular activity group may show statistics including activity counts (e.g., a number of users that have traversed through one or more activities), average time spent on activities in the activity group, and abandon counts (e.g., a number of users that abandoned an activity in the activity group).

As another example, client device 145 may display a flow diagram showing flows based on session data representing the individual activities a user navigated during a single session. In this case, the visualization may show nodes corresponding to individual activities navigated by a user of user device 105 during a particular session. Each node associated with an individual activity may show information identifying the activity, activity group, and flow associated with the node.

As shown in FIG. 1B, client device 145 may display a flow diagram of utilization of a purchasing application generated by the cloud platform. As shown by reference number 142, the flow diagram may identify a user activity to initiate use of the application (e.g., a count of people, an average time at the particular activity, a count of abandonments at the particular activity, etc.).

As shown by reference number 144, the flow diagram may identify a number of users proceeding from the particular activity to a next activity. As shown by reference number 146, the flow diagram may identify the next activity (e.g., a user interface titled "smartphone gridwall"). As shown by reference number 148, the flow diagram may identify a number of users proceeding to a next activity (e.g., a product design page (PDP) activity). Although described herein, in terms of a set of pages, such as a PDP or the like, and associated activity, implementations, described herein, may be used to monitor other types of pages or activity, such as other pages relating to a website, a website including other types of flows, or the like.

As shown by reference numbers 150 and 152, the flow diagram may identify users and/or user devices proceeding from the PDP activity to error states. Based on identifying the users and/or user devices, cloud platform 110 may determine that an error exists for a PDP user interface of the application, and may automatically generate code to remediate the error, such as using a machine learning technique, an automatic code generation technique, and/or the like. In some implementations, cloud platform 110 may perform a code analysis, such as by parsing the code, using a machine learning technique to analyze the code, comparing the code to other code on another user interface, or the like to identify an error in the code that causes an error with a user interface. Based on identifying the error in the code, cloud platform 110 may generate replacement code, such as by using a code generation tool, a code template, a machine learning technique, or the like. In another example, cloud platform 110 may generate a trouble ticket or another type of alert, such as a text, an e-mail, a voice message (e.g., by providing a recorded message, by using a computer vocalization technique to generate a message, or the like), etc. for resolution by a developer based on identifying an error that satisfies a threshold criterion, such as a threshold quantity of occurrences of the error.

As shown in FIG. 1C, cloud platform 110 may cause client device 145 to display an example of errors detected by cloud platform 110 based on the flow diagram described with regard to FIG. 1B. In FIG. 1C, the columns identify activities, event types (e.g., a page opening, a click occurring, etc.), a grouping (e.g., a portion of the application being used, such as an account portion, a secure portion, a menu portion, etc.), a flow name, and a time stamp. Other combinations of information or types of information is possible than what is described herein.

As shown in FIG. 1D, cloud platform 110 may cause client device 145 to display error correction recommendations. For example, client device 145 may display a recommendation to roll back a software update, a recommendation to reallocate application cloud processing resources, and/or a recommendation to fix a broken link. In this case, the operator may select or de-select each recommendation and click on an "Implement" button to implement the selected recommendations. Based on the user interaction, cloud platform 110 may transmit messages to one or more servers to implement the recommendations. In another example, cloud platform 110 may automatically implement the recommendations, such as based on the recommendations satisfying a set of threshold criteria associated with cost, feasibility, likelihood of success, and/or the like. For example, cloud platform 110 may communicate with a server storing code relating to a user interface to alter the code. Similarly, cloud platform 110 may replace a software update with a previous version of the software, and may communicate with user devices 105 to provide the previous version of the software and cause the user devices 105 to replace the software update with the previous version of the software, or the like. In this way, implementations described herein increase speed of data collection, increase speed of data presentation, and improve error activity management.

As indicated above, FIGS. 1A-1D are provided merely as an example. Other examples are possible and may differ from what was described with regard to FIGS. 1A-1D.

Figure 2:
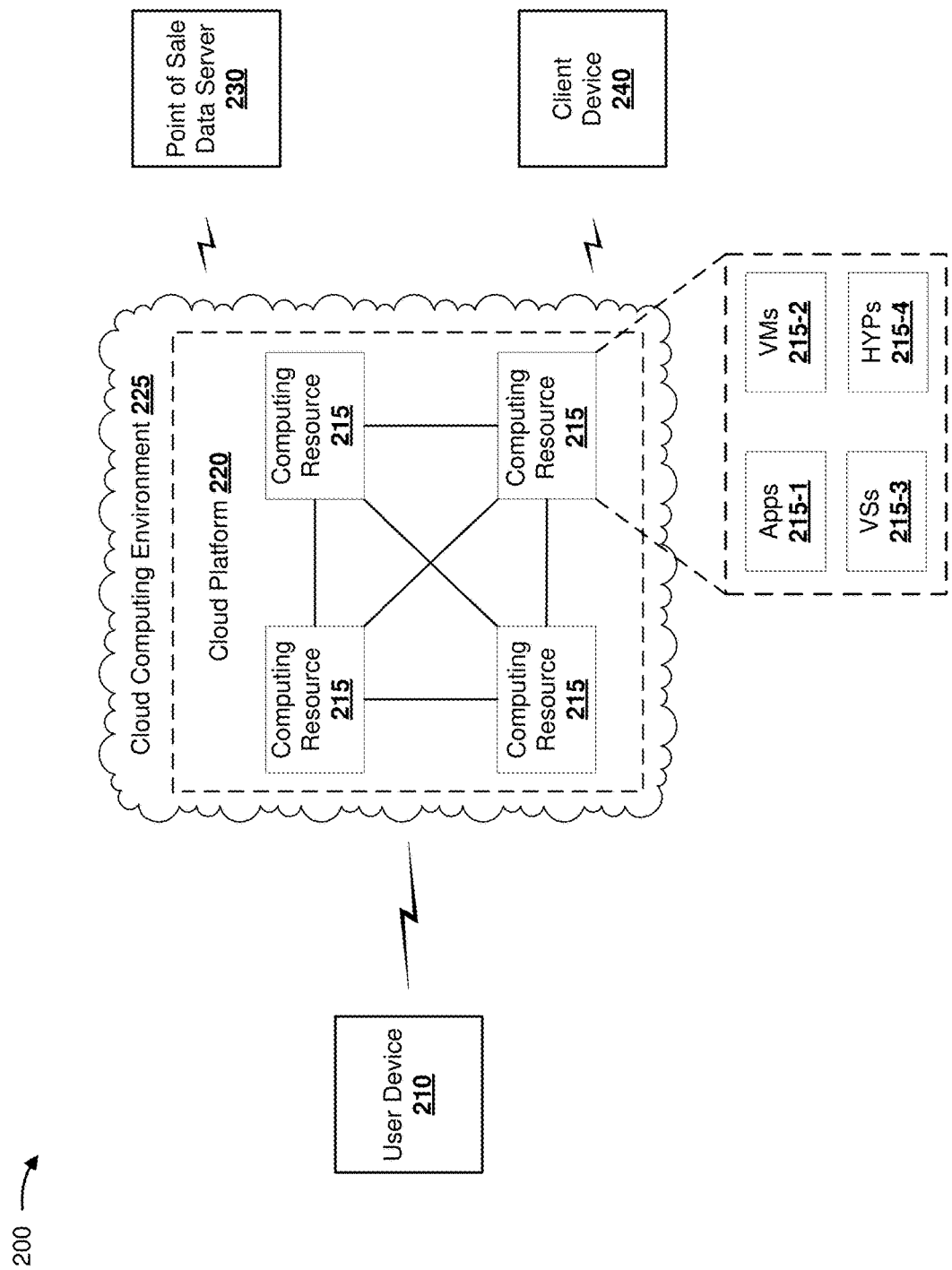
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, cloud platform 220 hosted within cloud computing environment 225, point of sale data server 230, and client device 240. Devices of environment 200 may interconnect via wired connections, wireless connections, or a combination of wired and wireless connections.

User device 210 includes one or more devices capable of receiving, generating, storing, processing, and/or providing information associated with an application. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device that provides log data in near real-time for processing by cloud platform 220. In some implementations, user device 210 corresponds to user device 105 shown in FIG. 1.

Cloud platform 220 is included in cloud computing environment 225 and delivers computing as a service, whereby shared resources, services, etc. may be provided to perform real time and near real-time collection and analysis of log entry data. Cloud platform 220 may provide computation, software, data access, storage, and/or other services that do not require end-user knowledge of a physical location and configuration of a system and/or a device that delivers the services. As shown, cloud platform 220 may include computing resource 215, applications ("Apps") 215-1, virtual machines ("VMs") 215-2, visualized storage ("VSs") 215-3 and hypervisors ("HYPs") 215-4. In some implementations, cloud platform 220 corresponds to cloud platform 110 shown in FIG. 1.

Computing resource 215 includes one or more personal computers, workstation computers, server devices, or another type of computation and/or communication device. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections. In some implementations, computing resources 215 may be allocated to implement web server 112, message queuing server 114, analytics server 116, and/or front-end server 118, shown in FIG. 1. In some implementations, one or more of computing resources 215 may be allocated to implement web server 112, message queuing server 114, analytics server 116, and/or front-end server 118 may be implemented via a server or cloud computing environment external to cloud computing environment 225, and may be exposed via an application programming interface (API) that may be utilized by cloud platform 220.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, and/or the like.

Application 215-1 includes one or more software applications that may be provided to or accessed by user device 210, client device 240, and/or the like. Application 215-1 may eliminate a need to install and execute the software applications on user device 210, client device 240, and/or the like. For example, application 215-1 may include software associated with obtaining log data, providing a visualization of log data and/or any other software capable of being provided via cloud platform 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 210), and may manage infrastructure of cloud computing environment 225, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Point of sale data server 230 includes one or more devices capable of receiving, generating, storing, processing, and/or providing information at a point of sale. For example, a network operator may operate a storefront that a user may use to purchase, upgrade, activate, and/or the like network services. In this case, point of sale data server 230 may provide data regarding user use of the storefront obtained from a set of point of sale devices, a set of sensor devices, and/or the like, and cloud platform 220 may utilize the data in analyzing user use of a corresponding application (e.g., to purchase, upgrade, activate, and/or the like). In this way, cloud platform 220 integrates information regarding store based user activity and log based user activity into determining an intended user usage of an application.

Client device 240 includes one or more devices capable of receiving, generating, storing, processing, and/or providing information associated with a log entry. For example, client device 240 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 240 may provide a user interface with a visualization of a portion of log data relating to a set of log entries, based on cloud platform 220 providing the visualization for display.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
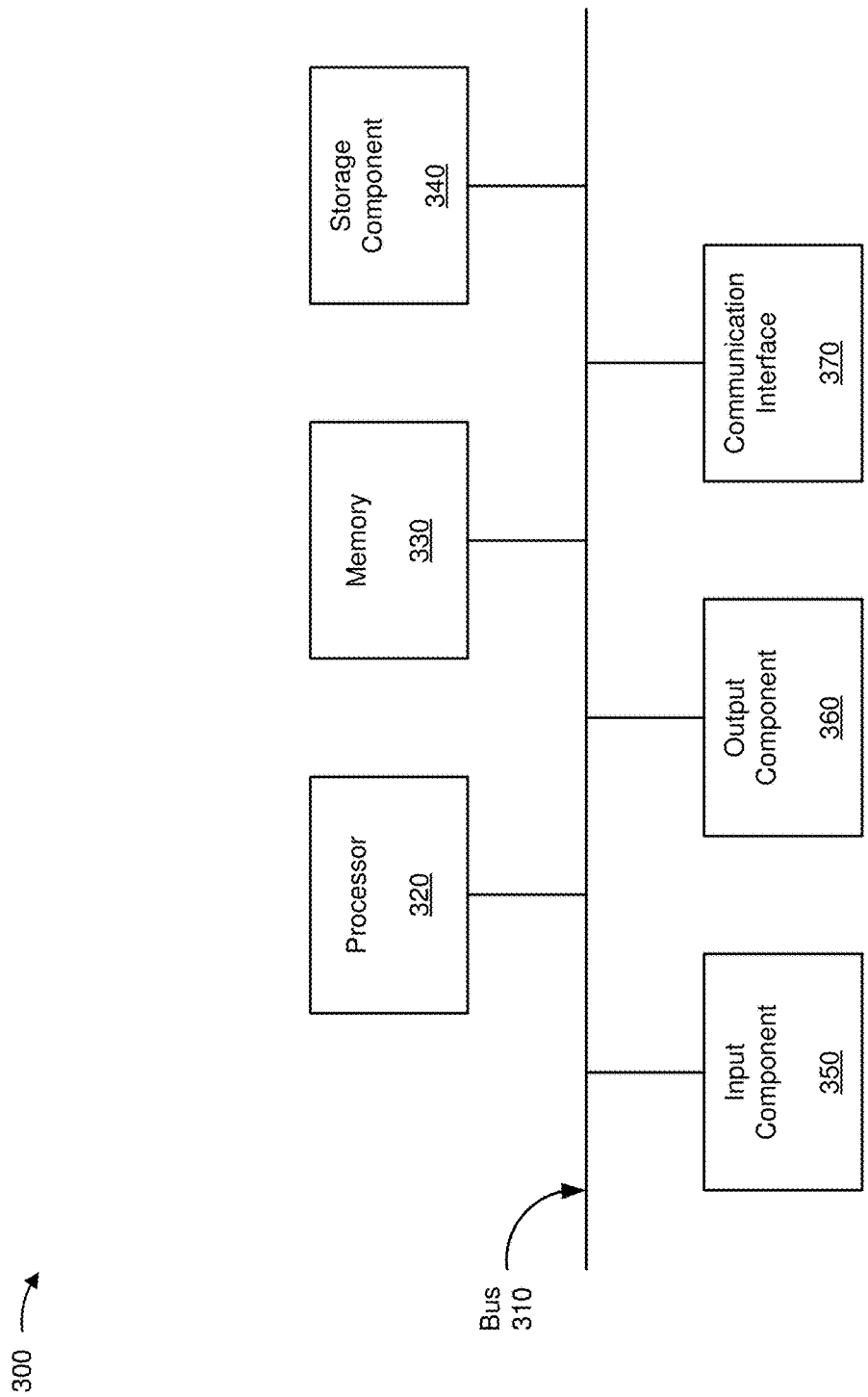
FIG. 3 is a diagram of example components of one or more devices of FIG. 2.

FIG. 3 is a diagram of example components of a device 300. Device 300 may correspond to user device 210, point of sale data server 230, and/or client device 240. In some implementations, user device 210, point of sale data server 230, and/or client device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
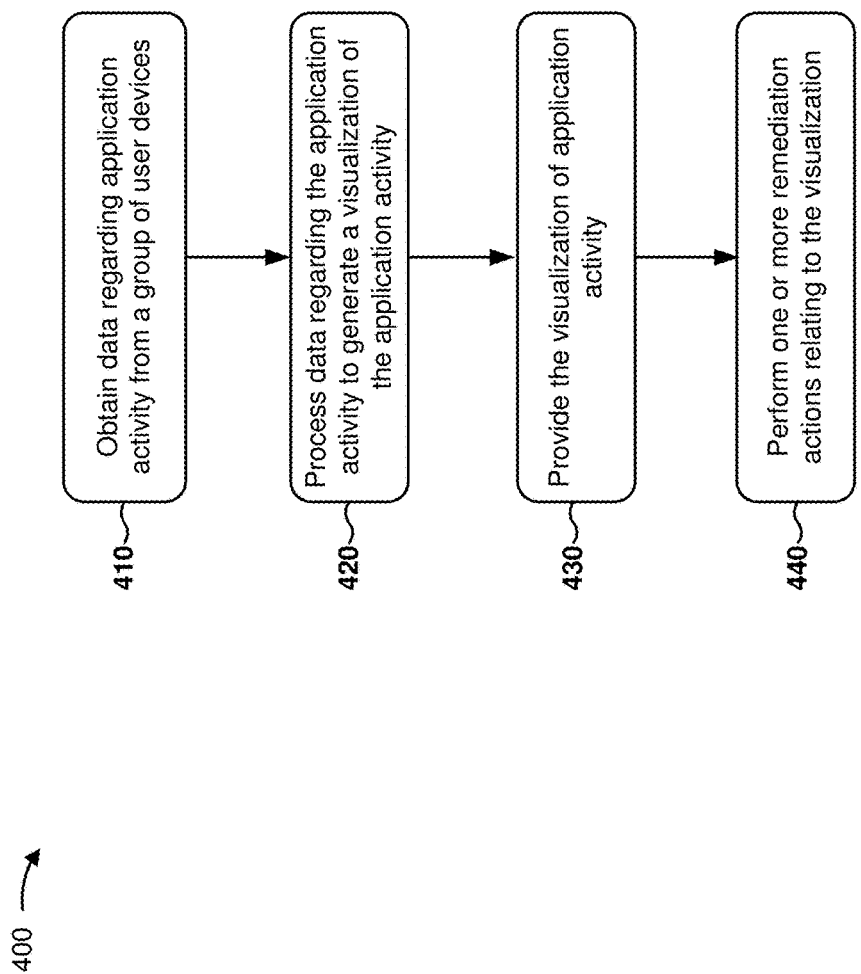
FIG. 4 is a flow chart of an example process for generating a visualization of application utilization based on analyzing log data associated with the application.

FIG. 4 is a flow chart of an example process 400 for generating a visualization of application utilization based on data associated with the application. In some implementations, one or more process blocks of FIG. 4 may be performed by cloud platform 220. In some implementations, one or more process blocks of FIG. 4 may be performed by another device or a group of devices separate from or including cloud platform 220, such as user device 210, point of sale data server 230, and/or client device 240.

As shown in FIG. 4, process 400 may include obtaining data regarding application activity from a group of user devices (block 410). For example, cloud platform 220 may obtain data from one or more user devices 210 regarding application activity on the one or more user devices 210. The data obtained may include data associated with buttons pressed, data entered, links selected, screens displayed, information obtained, errors identified, menus displayed, menu selections obtained, time stamps, and/or the like.

In some implementations, cloud platform 220 may obtain the data from a data source, such as point of sale data server 230. For example, when a user visits a real or virtual merchant or store, cloud platform 220 may obtain data associated with activity logged by a point of sale device (e.g., what was purchased, what the user was interested in, what the user accessed, what a store representative logged in the point of sale device regarding a user's interest, etc.). In this case, cloud platform 220 may correlate data to user utilization of a mobile application-based storefront to identify an error in the application. For example, cloud platform 220 may correlate the data to determine whether the user is unable to find the same network setup option on the application that the user selected and/or enquired about in the store.

In some implementations, cloud platform 220 may obtain the data from a mobile device, such as user device 210. For example, cloud platform 220 may obtain the data from an application on the mobile device. In some implementations, cloud platform 220 may obtain the data based on a user of the mobile device initiating and/or terminating a session of an application. Additionally, or alternatively, cloud platform 220 may obtain the data based on an event being logged for the application (e.g., a button press, processing a function, a data transmission, etc.). In some implementations, cloud platform 220 may obtain the data from many mobile devices (e.g., thousands, millions, or billions of mobile devices, etc.). In some implementations, cloud platform 220 may obtain millions, billions, trillions or more of items of data for analysis.

In some implementations, cloud platform 220 may obtain the data based on a mobile device identifying the data, storing the data, and/or logging the data. For example, user device 210 may store the data on user device 210 and may transmit the data to cloud platform 220 when a triggering event occurs (e.g., session expiry, the user transferring the application to operating in the background, such as a result of an incoming call, connecting user device 210 to a charger, selecting an menu option, and/or the like). In some implementations, cloud platform 220 may collect the data in near real-time (e.g., real-time, substantially real-time, within a threshold period of time, such as within 1 millisecond, 1 second, etc.) relative to the triggering event occurring.

In some implementations, cloud platform 220 may obtain the data using any type of server including but not limited to Nginx servers, IBM MQ servers, IBM streams, Kafka Q servers, and/or an Apache Hadoop system. In some implementations, cloud platform 220 may use the Nginx servers, IBM MQ servers, IBM streams, Kafka Q servers, and/or Apache Hadoop system to collect the data in near real time. In this way, cloud platform 220 may collect a large number (e.g., thousands, millions, billions, etc.) of data entries regarding application activity in near real-time, thereby increasing the speed of data collection.

As further shown in FIG. 4, process 400 may include processing data regarding the application activity to generate a visualization of the application activity (block 420). For example, cloud platform 220 may process data regarding the application activity from user devices 210 to generate a visualization of the application activity for display on client device 240.

In some implementations, cloud platform 220 may process the data to organize the data, correlate the data, time-stamp the data, and/or the like. In some implementations, cloud platform 220 may sort and/or filter the data. For example, cloud platform 220 may correlate the data by application, by user, by user device, by session, and/or the like. In some implementations, cloud platform 220 may remove bad data from the data, such as data with a value that is outside a range of acceptable values. For example, cloud platform 220 may remove data intended to represent a phone number when the data does not have a correct number of digits. As another example, cloud platform 220 may remove data indicating a very large processing time (e.g., 5000 hours), thereby reducing a likelihood of anomalous or incorrectly recorded data affecting processing of other data, which may reduce overall processing time relative to cloud platform 220 attempting to account for the anomalous data in a calculation and generation of a visualization.

In some implementations, cloud platform 220 may generate a visualization of the application activity that includes multiple tiers of visualization. For example, the visualization may include a flow diagram of user activity (e.g., user movement through multiple user interfaces of an application), types of user activity broken down by data and usage activities, billing activities and payment activities, purchasing activities and upgrading activities, retail experience activities, set-up activities, usage review activities (e.g., review of user usage of provided services), and/or the like. Additionally, or alternatively, the visualization may identify activity metrics, average time, abandonment metrics, and/or the like. In some implementations, cloud platform 220 may anonymize user activity to remove user-identifying information.

In some implementations, cloud platform 220 may generate a visualization of the application activity that indicates initiating activity and/or terminating activity. For example, cloud platform 220 may utilize colors, line styles, patterning, and/or the like, to represent metrics relating to application activity. In some implementations, cloud platform 220 may generate a visualization that includes flow diagrams, tables, pie charts, and/or the like. In some implementations, cloud platform 220 may generate a visualization that includes animation and/or video. For example, the visualization may provide a graphical simulation of user activity to trace multiple time steps of user activity or view user activity as the user activity happens (i.e., in real time).

In some implementations, cloud platform 220 may generate an output, such as a flow diagram showing flows based on aggregated data representing application activity for multiple users and/or multiple user devices 210. For example, the visualization may include a first portion that prompts a user for selection of flows. In this case, the user may select multiple flows (e.g., all flows). The first portion may also prompt the user for selection of a time period over which to represent the flows.

Additionally, or alternatively, the visualization may include a second portion that shows multiple nodes. Each node may identify a particular flow, and may show information including a number of users accessing the flow, an average time spent by the users, and/or a count of the users that ended their navigation inside the particular flow, as determined over the selected time period.

Additionally, or alternatively, the visualization may include a third portion that shows a graphical representation (e.g., a pie chart) for incoming traffic to a node selected by the user (e.g., from the second portion), a graphical representation (e.g., a pie chart) for outgoing traffic from the selected node, and/or a graphical representation (e.g., a pie chart) for activities (e.g., associated with a portion of the graphical representation of incoming traffic or outgoing traffic that is selected by the user).

In some implementations, cloud platform 220 may generate a flow diagram showing flows based on user data representing application activity for a single user and/or a single user device 210. For example, the visualization may include a first portion that prompts the operator for selection of flows and/or a time period, as described above. In this case, the operator may select a particular flow.

In some implementations, cloud platform 220 may dynamically update the visualization. For example, cloud platform 220 may dynamically alter the flow diagram based on real-time import of application activity data for a single user, a group of users, a single session, etc. Additionally, or alternatively, cloud platform 220 may dynamically update the visualization based on an operator selection. For example, an operator may select a particular portion of the flow diagram associated with a particular portion of a mobile application, and cloud platform 220 may alter the flow diagram to omit other portions of the flow diagram, provide additional data regarding the particular portion of the flow diagram, etc.

Additionally, or alternatively, the visualization may include a second portion that shows multiple nodes representing activity groups associated with one or more individual flows. Each node associated with a particular activity group may show statistics including activity counts (e.g., a number of users that have traversed through one or more activities), average time spent on activities in the activity group, and/or abandon counts (e.g., a number of users that abandoned an activity in the activity group) as determined over the selected time period.

Additionally, or alternatively, the visualization may include a third portion that shows a graphical representation (e.g., a pie chart, bar chart, line chart, graph or any other visual representation) for incoming traffic to a node selected by the operator (e.g., from the second portion), a graphical representation (e.g., a pie chart, bar chart, line chart, graph or any other visual representation) for outgoing traffic from the selected node, and/or a graphical representation (e.g., a pie chart, bar chart, line chart, graph or any other visual representation) for activities (e.g., all activities) associated with a portion of the graphical representation of incoming traffic or outgoing traffic that is selected by the operator.

In some implementations, cloud platform 220 may generate a flow diagram showing flows based on session data representing individual activities that a user navigated during a single session. For example, the visualization may include a first portion that prompts the operator for selection of a time period, for selection of a device identifier (e.g., a mobile directory number, a device name, a user identifier, an account number), and/or for selection of a session time associated with a particular session.

Additionally, or alternatively, the visualization may include a second portion that shows nodes corresponding to individual activities navigated by a user of user device 105 during a particular session. Each node associated with an individual activity may show information identifying the activity, activity group, and/or flow associated with the node, as determined over the selected time period.

In some implementations, cloud platform 220 may generate a visualization of the application activity that identifies errors. Such errors may include user information, such as invalid credit card information or ineligibility for a device upgrade, and/or application errors, such as power network connectivity, an unavailable server, and/or the like. In some implementations, cloud platform 220 may identify repeating flows that lead to errors. For example, cloud platform 220 may utilize pattern recognition, image recognition of flow images, etc., to identify the repeating flows.

In some implementations, cloud platform 220 may perform automatic identification of errors based on outlier data, neural network processing, learning algorithms, heuristics, artificial intelligence (any other technical techniques for automatic processing of data). For example, cloud platform 220 may determine that a threshold quantity of log entries include a flow to a state that results in user devices 210 or mobile applications thereof being restarted, and may identify an error with a portion of a mobile application. In this case, cloud platform 220 may identify remediation or corrective actions. For example, cloud platform 220 may identify a previously used remediation or corrective action, may select an action from a data structure, may receive an operator selection of a remediation or corrective action (e.g., based on providing information via client device 240), and/or the like.

In some implementations, cloud platform 220 may generate a recommendation for remediation or correction (e.g., a recommended action), such as based on a machine learning technique, a heuristic technique, a pattern recognition technique, and/or the like. For example, cloud platform 220 may identify that a button click is associated with a threshold likelihood of an error state, may perform an analysis of code associated with the button, and may determine that an error exists for the code associated with the button (e.g., based on performing a pattern analysis to compare the code associated with the button to code associated with other buttons). In this case, cloud platform 220 may correct the identified problem with the button by altering the code associated with the button based on the code associated with the other buttons, may correct or revise the user interface by removing the button (e.g., temporarily until a developer can revise the code for the button), or the like. In this way, cloud platform 220 may correct or revise a user interface in real-time relative to errors occurring.

In some implementations, cloud platform 220 may generate a visualization that includes identification of one or more errors and/or one or more remedial actions. In some implementations, cloud platform 220 may generate a user interface to include the visualization, the identified errors, and/or the recommendation for remediation or correction described above.

As further shown in FIG. 4, process 400 may include providing the visualization of application activity (block 430). For example, cloud platform 220 may provide the visualization of application activity for display on client device 240.

In some implementations, cloud platform 220 may provide the visualization via client device 240 to a network operator. For example, cloud platform 220 may provide a user interface (e.g., the user interface described with reference to block 420) including the visualization. In this case, cloud platform 220 may identify a flow and/or identify an error (e.g., identify a corrective action recommendation, identify a corrective action that has been performed, etc.).

As further shown in FIG. 4, process 400 may include performing one or more corrective actions relating to the visualization (block 440). For example, cloud platform 220 may perform one or more corrective actions relating to the visualization.

In some implementations, cloud platform 220 may perform a remedial action automatically. For example, cloud platform 220 may automatically generate code to alter an application, automatically roll back an update to an application, automatically assign a developer to fix an error, automatically alter a user interface (e.g., a layout of a user interface, a size of a user interface, a typeface of a user interface, a color of a user interface, text content of a user interface, image content of a user interface, etc.), automatically transmit one or more messages (e.g., to users of a mobile application, to developers, to network operators, etc.), or the like, based on a threshold score being associated with the remediation or corrective action. In this case, cloud platform 220 may score each potential remediation or corrective action based on feasibility, cost, likelihood of fixing an error, etc., and may automatically implement one or more remediation actions that satisfy a score threshold. In some implementations, cloud platform 220 may perform a remediation or corrective action based on an operator selection (e.g., after providing the visualization). In some implementations, cloud platform 220 may provide information identifying the performed remediation or corrective action via the user interface that is provided to include the visualization of application activity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a cloud network to collect application activity data in near real-time for near real-time analysis and remediation and/or correction of detected issues. For example, the cloud network may collect the activity data, perform analysis and/or remediation within a threshold period of time of an error occurring, of a log entry being generated, etc., such as within 1 millisecond, 1 second, and/or the like. In this way, implementations described herein increase speed of data collection, increase the speed of data presentation, and improve error activity management.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more processors to:
obtain data regarding application activity from a group of user devices,
the application activity relating to an application associated with services provided by a network operator, and
the data regarding the application activity including logs of user interactions with the application,
the logs of user interactions mapping user experiences for sessions associated with utilization of the application;
process the data regarding the application activity to generate a visualization of the application activity,
the visualization including multiple tiers, a first tier, of the multiple tiers, relating to the group of user devices,
the first tier being associated with a first flow diagram having first nodes representing first activity groups that indicate a first portion of the application activity associated with the group of user devices,
a second tier, of the multiple tiers, relating to a particular user device of the group of user devices,
the second tier being associated with a second flow diagram having second nodes representing second activity groups that indicate a second portion of the application activity associated with the particular user device, and
a third tier, of the multiple tiers, relating to a particular session of utilization of the application by the particular user device,
the third tier being associated with a third flow diagram having third nodes representing third activity groups that indicate a third portion of the application activity associated with the particular session;
the visualization identifying one or more errors associated with the application activity, and
the visualization providing at least one activity count specifying traversal of a respective application activity associated with at least one of the first activity groups, the second activity groups, or the third activity groups;
provide the visualization for display,
the visualization being provided for display via a client device associated with the network operator; and
automatically implement, without human intervention, a correction to the one or more errors.

2. The device of claim 1, where the one or more processors, when processing the data, are to:
process the data using a machine learning technique.

3. The device of claim 1, where the one or more processors, when processing the data, are to:
process the data to generate the first flow diagram, the second flow diagram, and the third flow diagram,
each of the first flow diagram, the second flow diagram, and the third flow diagram representing a respective path of user interactions with the application.

4. The device of claim 1, where the one or more processors, when obtaining the data, are to:
obtain the data using at least one of:
an NGINX server,
an MQ server,
an IBM stream,
a Kafka Q server, or
a Hadoop system.

5. The device of claim 1, where the one or more processors, when processing the data, are to:
group a subset of log entries based on timestamp information of the subset of log entries; and
generate the visualization based on the subset of log entries.

6. The device of claim 1, where the one or more processors are further to:
identify the one or more errors associated with the application activity based on processing the data;
generate a recommendation identifying the correction to the one or more errors; and provide information identifying the recommendation for display.

7. The device of claim 1, where the one or more processors, when automatically implementing the correction, are to:
automatically alter the application to implement the correction to the one or more errors.

8. A system, comprising:
one or more computing resources to implement:
a web server to provide an interface to obtain application activity data regarding application activity of a group of user devices,
the application activity data including logs of user interactions with an application, and
the logs of user interactions mapping user experiences for sessions associated with utilization of the application;
a message queuing server to obtain the application activity data from the web server and queue the application activity data for processing;
an analytics server to process the application activity data; and
a front-end server to generate a visualization based on processing the application activity data and provide the visualization for display via a client device,
the visualization including multiple tiers,
a first tier, of the multiple tiers, relating to the group of user devices,
the first tier being associated with a first flow diagram having first nodes representing first activity groups that indicate a first portion of the application activity associated with the group of user devices;
a second tier, of the multiple tiers, relating to a particular user device of the group of user devices,
the second tier being associated with a second flow diagram having second nodes representing second activity groups that indicate a second portion of the application activity associated with the particular user device; and
a third tier, of the multiple tiers, relating to a particular session of utilization of the application by the particular user device,
the third tier being associated with a third flow diagram having third nodes representing third activity groups that indicate a third portion of the application activity associated with the particular session; and
the visualization providing at least one activity count specifying traversal of a respective application activity associated with at least one of the first activity groups, the second activity groups, or the third activity groups.

9. The system of claim 8, where the analytics server further comprises:
a recommendation server to generate a recommendation to correct an error with the application based on the application activity data.

10. The system of claim 8, where each of the first flow diagram, the second flow diagram, and the third flow diagram depict functionalities of the application.

11. The system of claim 10, where each of the first flow diagram, the second flow diagram, and the third flow diagram represent a transfer of the application activity from a first functionality of the functionalities to a second functionality of the functionalities.

12. The system of claim 8, further comprising:
an error identification computing resource to identify an error in the application based on the application activity data.

13. The system of claim 8, further comprising:
a data acquisition computing resource to acquire data from one or more point of sale devices and provide the data to the analytics server to process with the application activity data.

14. A non-transitory computer-readable medium storing instructions, the instructions comprising:
one or more instructions that, when executed by one or more processors, cause the one or more processors to:
obtain data regarding application activity from a group of user devices,
the application activity relating to an application associated with network operator services provided by a network operator, and
the data regarding the application activity including logs of user interactions with the application,
the logs of user interactions mapping user experiences for sessions associated with utilization of the application;
process the data regarding the application activity to generate a visualization of the application activity,
the visualization including multiple tiers,
a first tier, of the multiple tiers, relating to the group of user devices,
the first tier being associated with a first flow diagram having first nodes representing first activity groups that indicate a first portion of the application activity associated with the group of user devices,
a second tier, of the multiple tiers, relating to a particular user device of the group of user devices,
the second tier being associated with a second flow diagram having second nodes representing second activity groups that indicate a second portion of the application activity associated with the particular user device, and
a third tier, of the multiple tiers, relating to a particular session of utilization of the application by the particular user device,
the third tier being associated with a third flow diagram having third nodes representing third activity groups that indicate a third portion of the application activity associated with the particular session;
the visualization identifying one or more errors associated with the application activity, and
the visualization providing at least one activity count specifying traversal of a respective application activity associated with at least one of the first activity groups, the second activity groups, or the third activity groups;
provide the visualization for display,
the visualization being provided for display via a client device associated with the network operator; and
implement a recommendation to remediate the one or more errors associated with the application activity.

15. The non-transitory computer-readable medium of claim 14, where the one or more instructions, when executed by the one or more processors, further cause the one or more processors to:
receive a selection of the recommendation based on providing the visualization; and
where the one or more instructions, that cause the one or more processors to implement the recommendation, cause the one or more processors to:
implement the recommendation based on receiving the selection of the recommendation.

16. The non-transitory computer-readable medium of claim 14, where the one or more instructions, when executed by the one or more processors, further cause the one or more processors to:
generate the recommendation based on processing the data.

17. The non-transitory computer-readable medium of claim 16, where the one or more instructions, that cause the one or more processors to generate the recommendation, cause the one or more processors to:
generate the recommendation using at least one of:
a machine learning technique,
a heuristic technique, or
a pattern recognition technique.

18. The non-transitory computer-readable medium of claim 14, where the one or more instructions, when executed by the one or more processors, further cause the one or more processors to:
obtain the data regarding the application activity in near real-time relative to one or more events associated with the application.

19. The non-transitory computer-readable medium of claim 14, where the application activity relates to at least one of:
a set-up activity,
a billing activity,
a purchasing activity,
an upgrading activity, or
a usage review activity.

20. The device of claim 1, where the logs of user interactions with the application comprise a consolidated log file associated with multiple time periods or multiple user devices.

* * * * *